United States Patent Office 3,421,697
Patented Jan. 14, 1969

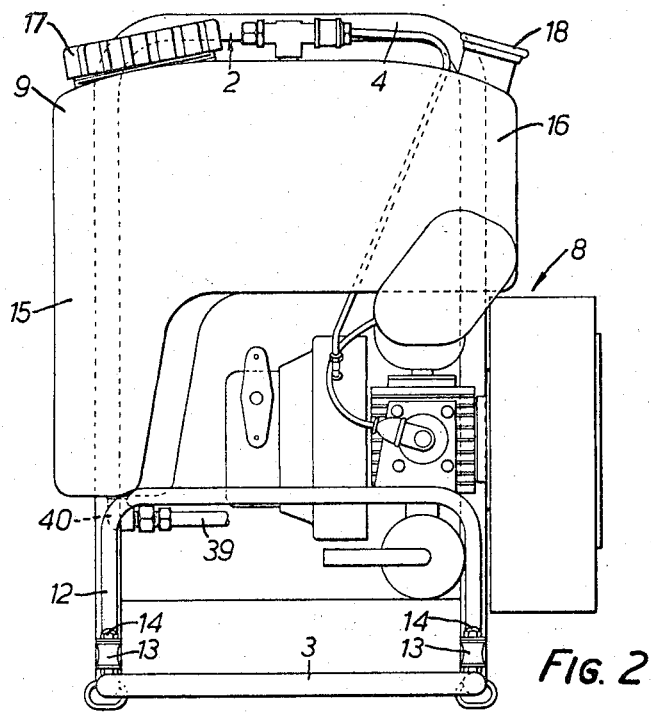
FIG. 2
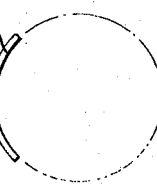
FIG. 4
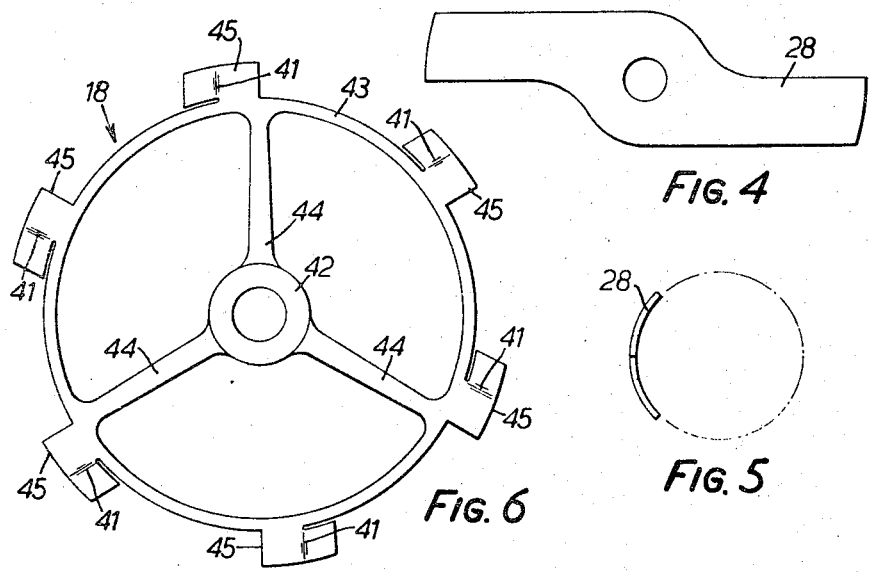
FIG. 6
FIG. 5

3,421,697
SPRAYING EQUIPMENT
Peter Edmund Marks, Hope View, Bodenham, England, assignor to Birfield Engineering Limited, London, England
Filed Dec. 5, 1966, Ser. No. 599,166
Claims priority, application Great Britain, Dec. 4, 1965, 51,554/65
U.S. Cl. 239—152        9 Claims
Int. Cl. B05b 9/08; A01n 17/08; B05b 3/04

ABSTRACT OF THE DISCLOSURE

Spraying equipment comprising a body harness attached to a back support frame on which are mounted an engine and fan unit, a fuel reservoir, a tank providing a spraying liquid reservoir and a flexible duct which is connected to the fan outlet and adjacent the other or outlet end contains a rotary atomiser which in use is driven by the air stream along the duct. The tank is of inverted generally L-shaped form with a vertical limb offset to the left-hand side of the frame and disposed alongside the engine which is offset to the right-hand side, the arrangement being such that in use the duct is disposed at the right side of the operator so that a handle attached to the duct can conveniently be held in his right hand.

---

Figure 1:
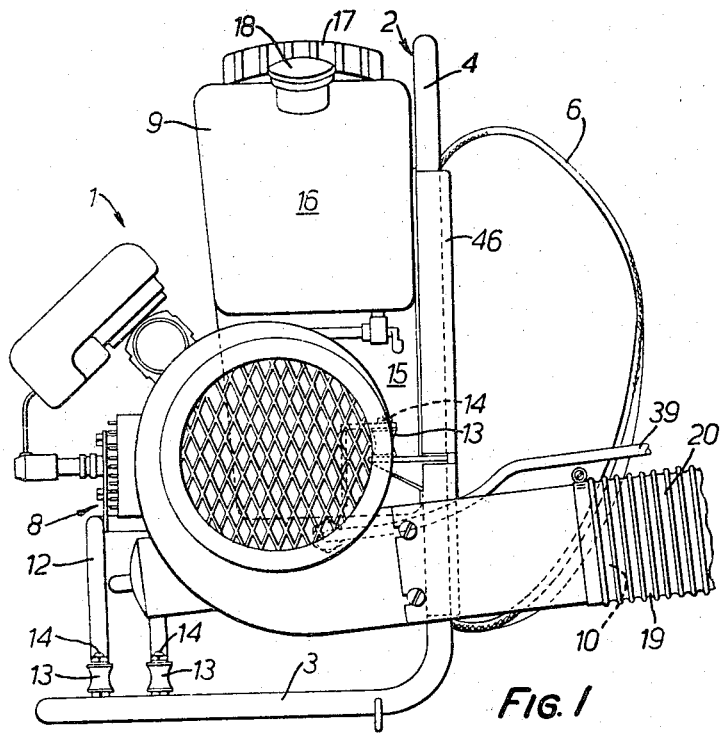

This invention relates to spraying equipment for spraying standing crops and the like with liquid in the form of atomised droplets. More particularly, the invention is concerned with portable spraying equipment embodying a body harness by which the equipment is carried on the back of an operator and operated by him as he walks between rows of standing crops.

The object of the invention is to provide motorised spraying equipment of a particularly compact form which can be of a weight such that it is usable for long periods without undue operator fatigue or discomfort.

To this end spraying equipment in accordance with the invention comprises a body harness attached to a back support frame on which are mounted an engine and fan unit, a fuel reservoir and a spraying liquid reservoir, a flexible duct which is connected to the fan outlet and adjacent the other or outlet end contains a rotary atomiser which in use is driven by the airstream along the duct, a liquid supply pipe connected to the liquid reservoir for feeding the liquid to the atomiser, and a handle attached to the duct by which the latter can be held and the spray issuing therefrom directed forwardly by the operator, the arrangement being such that in use the duct is disposed at the right side of the operator so that said handle can conveniently be held in his right hand.

The fuel and spraying liquid reservoirs are preferably provided by separate compartments in a single tank, and a particularly convenient construction results if this tank is of inverted generally L-shaped form with the vertical limb offset to the lefthand side of the frame and disposed alongside the engine which is accordingly offset to the righthand side. The vertical limb may provide part of the liquid reservoir and the weight of the spraying liquid then acts to offset the weight of the engine and fan unit for balancing purposes.

Engine controls and a spraying liquid control valve are conveniently mounted on the handle so that they are within reach of the operator during spraying, and the handle itself may be tubular and provide a duct by which the spraying liquid is fed into the atomiser. The atomiser is preferably of known form, employing a rotary gauze drum to the inner surface of which the liquid is supplied and from which the atomised droplets are flung by centrifugal force into the passing airstream. The cylinder is mounted on a spindle which is supported in suitable bearings and carries a windmill or turbine blade structure which is driven by the airstream.

Figure 3:
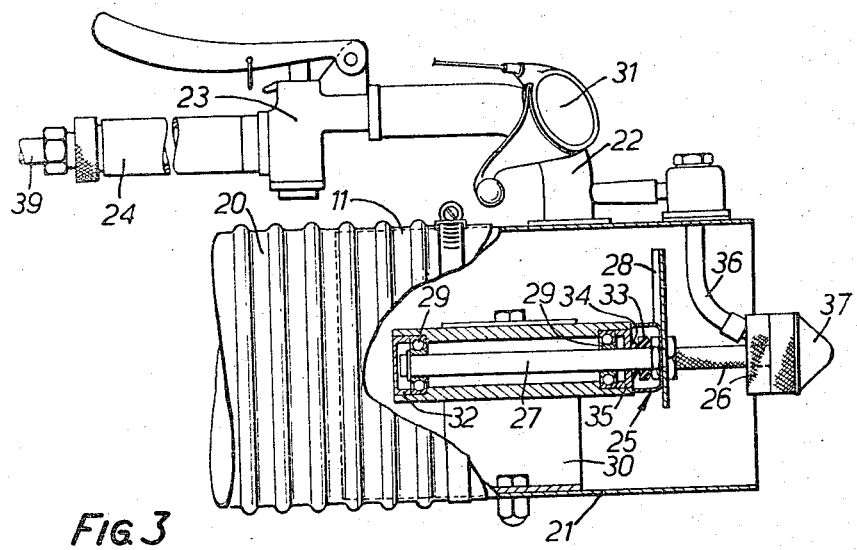
Figure 7:
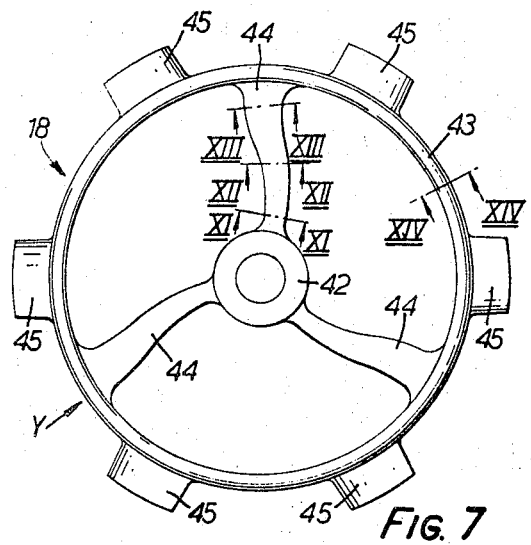
Figure 8:
Figure 9:
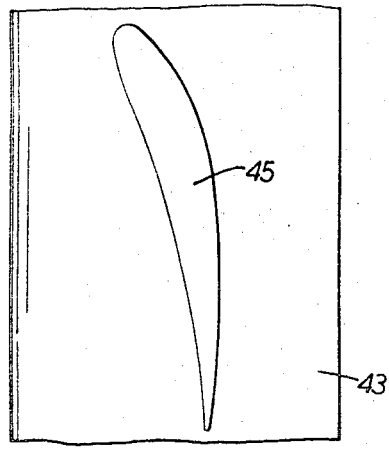
Figure 10:
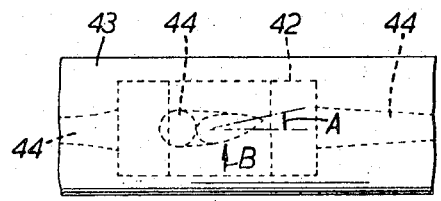

The invention will now be further described with reference to the accompanying drawings which show, by way of example, portable spraying equipment embodying the invention and comprising a power unit for carrying on the back of an operator and a rotary atomiser connected to the power unit by a flexible duct. In the drawings::

FIGURE 1 is a side elevation of the power unit,
FIGURE 2 is a rear elevation of the power unit,
FIGURE 3 is an axial sectional view of the rotary atomiser, to an enlarged scale,
FIGURES 4 and 5 show a turbine wheel of the rotary atomiser,
FIGURE 6 shows an alternative form of turbine wheel,
FIGURE 7 shows another alternative form of turbine wheel,
FIGURE 8 is a side view of FIGURE 7,
FIGURE 9 is a detail, to a larger scale, of FIGURE 8,
FIGURE 10 is a view in the direction of the arrow Y of FIGURE 7, and
FIGURES 11, 12, 13 and 14 are sections, to a larger scale, on the lines XI—XI, XII—XII, XIII—XIII and XIV—XIV respectively of FIGURE 7.

The power unit 1 comprises a back support frame 2 of tubular construction which has a horizontal square base portion 3 and a vertical rectangular portion 4. The power unit is provided with a body harness in the form of two shoulder straps 6 which are connected to the vertical portion 4 and which enable the power unit 1 to be carried on the back of the operator.

The horizontal base portion 3 provides a stand for the equipment when not in use and directly supports a small internal combustion engine and direct driven centrifugal fan unit 8; the vertical portion 4 supports a tank 9 of inverted L shape.

The engine and fan unit 8 is offset to the right-hand side of the frame 2 (FIGURE 2) and positioned so that in use a lower and forwardly directed tangential fan outlet 10 is positioned adjacent the righthand side of the operator. The unit 8 has a sub-frame 12 which is supported on vibration-absorbing metal and rubber mountings 13 on the horizontal frame portion 3 and the vertical portion 4, to which mountings 13 it is secured solely by three capnuts 14.

The tank 9 is moulded from a glass fibre reinforced synthetic resin and fits around the engine unit 8 with the vertical limb 15 of the inverted L immediately alongside the engine and the horizontal limb 16 immediately above the engine. Thus the centre of gravity of the tank 9 is offset to the left end and acts to counterbalance the weight of the engine and fan unit 8, and the vertical limb 15 provides a spraying liquid supply reservoir which is filled through a large filler cap 17 at the top of the tank 9. The horizontal limb 16 of the tank 9 to the side of the vertical limb 15 provides an engine fuel reservoir which is provided with a top filler cap 18 and in use contains a petrol mixture for the engine.

One end 19 of a flexible duct 20 is connected to the fan outlet 10 and at the outlet end 11 has a rigid metal terminal cowl 21 to the top of which is attached a tubular elbow portion 22 which communicates, through a control valve 23, with a tubular control handle 24 which can be grasped by the right hand of the operator to enable him to direct the spray issuing from the duct 20. Mounted within the cowl 21 is a rotary atomiser 25 of generally known form and employing two concentric gauze atomising cylinders 26. The atomiser 25 is mounted on a spindle 27 which carries a windmill or turbine wheel 28 and is supported in spaced low-torque bearing races 29 housed in a spider support structure 30. The upstream end of the bearing housing is permanently blanked off by a closure cap 32. The spindle 27 projects from the forward or downstream end of the housing and the shaft clearance at that end is closed when the spindle 27 is at rest and at speeds below about 5,000 r.p.m. by means of a neoprene seal 33 mounted on the spindle 27 with a sealing flange 34 which rests on a bearing cap 35. When the spindle speed rises above about 5,000 r.p.m. the sealing flange 34 flattens out under centrifugal force so that it lifts off the bearing cap 35 and no seal frictional drag remains. At this speed it is not possible for any dirt or spraying liquid to pass into the bearings or for the bearing lubricant to pass out, and the high atomiser speeds of the order of 15,000 r.p.m. are obtainable.

A liquid feed pipe 36, which is in communication with the tubular elbow portion 22, is mounted in the wall of the cowl 21 and directs liquid to be atomised between the two cylinders 26. A smoothly contoured nose member in the form of a dome nut 37 is screwed on the forward and downstream end of the spindle 4.

A throttle control lever and engine ignition switch 31 are mounted on the elbow portion 22 just forwardly of the control valve 23 and hence are accessible for engine control during spraying. The handle 24 provides a liquid supply duct for the atomiser and is connected to one end of a flexible supply pipe 39 which leads to the tank liquid outlet 40 (FIGURE 2).

The turbine wheel 28 (shown in detail in FIGURES 4 and 5) is made of mild steel sheet and is cadmium plated. The wheel 28 has two parallel blades which project in opposite directions but which are displaced laterally from one another. FIGURE 4 shows the wheel after it has been cut from a flat piece of mild steel and FIGURE 5 shows the wheel after it has been bent to provide the blades with the necessary airscrew formation.

FIGURE 6 shows the modified turbine wheel 18 which is stamped from light alloy sheet and which consists of a central annular hub 42 and a narrow rim 43 interconnected by three radial spokes 44 of minimum width consistant with adequate strength. Six equiangularly spaced integral blades 45 project on the radial outer side of the rim 43 and are in the form of tangentially elongated tabs which cover somewhat less than half their length are connected to the rim and are separated therefrom over the remainder of their length. The separated or unconnected portions are suitably bent as at 41 to provide the desired blade profile which will normally be of relatively fine pitch.

FIGURES 7 to 14 show a further modification of the turbine wheel 18 in which the latter is moulded from nylon to give a lightweight construction which virtually eliminates the problem of dynamic balancing associated with heavier constructions of turbine wheels. The wheel again comprises a hub 42 and outer rim 43 interconnected by three spokes 44 which extend generally radially from the hub 42 but are slightly curved to improve the stress distribution. The wheel rotates in a clockwise direction as seen in FIGURE 7 so that during rotation the spokes 44 are placed in compression thereby allowing them to be a smaller section, in a manner similar to the spokes of a cast iron flywheel.

Figure 13:
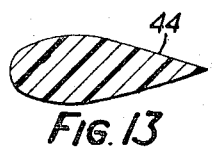
Figures 11, 12:
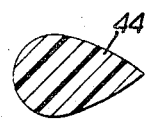

Each spoke 44 is of circular cross section at the root as shown in FIGURE 11 and the spoke develops into an aerofoil section at an immediate point along its length (FIGURE 12) and a different and more streamlined aerofoil section at its outer end FIGURE 13. As can be seen in FIGURE 10, each spoke is twisted by an angle A out of the central diametral plane of the disc. The trailing edge of each spoke is twisted out of its plane and downstream with respect to the airstream, the direction of which is indicated by the arrow B.

Figure 14:
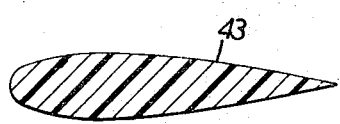

The blades 45 are designed with aerodynamic considerations in mind and have a longitudinally curved aerofoil section as shown in FIGURE 9. Six blades 45 are provided as before and each blade is curved longitudinally to give the required blade profile. The rim of the disc is also given an aerofoil section to reduce drag as shown in FIGURE 14.

Thus the invention provides a simple and compact piece of equipment which can readily be carried on the back of the operator in the manner of a knapsack, and the frame 2 is well covered with protective rubber padding 46 for operator comfort and to ensure that he can don the harness without banging any part of his body against protruding knobs or sharp edges. The back padding 46 and carefully designed shoulder straps 6 allow the equipment to be carried on the back for long periods with minimum discomfort. Offsetting the engine and fan unit 8 in the described manner enables the fan to deliver alongside the operator and hence provides as straight an air path as possible with resultant low loss in the duct 20, thus enabling highly efficient and satisfactory spraying to be obtained with a relatively small engine. Offsetting the engine in this manner results in no serious out of balance effect due to the counterbalancing provided by the weight of the spraying liquid in the tank 9.

In one specific construction utilising a duct cowling 21 of four inches diameter, a powerful directional spray can be produced with an airstream which picks up all the atomised droplets, thus providing efficient use of the spraying liquid, using an engine of 35 cc. capacity. This equipment can be made with a total weight, with the tank empty, of only 11 kilograms. In addition to this extremely light weight, the method of mounting of the engine and fan unit 8 results in substantially vibrationless operation. The mounting also enables the engine and fan unit 8 to be removed complete, with the duct 20, for maintenance or repair merely by removing the three capnuts 14 and disconnecting the liquid and fuel supply pipes.

I claim:

1. Spraying equipment comprising a body harness, a back support frame to which the harness is attached, an engine and fan unit mounted on the support frame, a tank providing a spraying liquid reservoir, a flexible duct the inlet end of which is connected to the fan outlet and which adjacent the outlet end contains a rotary atmosier which in use is driven by the airstream along the duct, a liquid supply pipe connected to the tank for feeding the liquid to the atomiser, and a handle attached to the duct by which the latter can be held and the spray issuing therefrom directed forwardly by the operator, the tank being of inverted generally L-shaped form with a vertical limb offset to the left-hand side of the frame and disposed alongside the engine which is offset to the right-hand side and the arrangement being such that in use the duct is disposed at the right side of the operator so that said handle can conveniently be held in his right hand.

2. Sraying equipment according to claim 1, wherein the spraying liquid reservoir and a fuel reservoir are provided by two compartments respectively formed in the two limbs of the tank.

3. Spraying equipment according to claim 2, wherein the vertical limb provides the liquid reservoir with the weight of spraying liquid offsetting the weight of the engine and fan unit for balancing purposes, and the horizontal limb provides the fuel reservoir.

4. Spraying equipment according to claim 1, wherein engine controls and a spraying liquid control valve are mounted on or adjacent the handle so that they are within reach of the operator during spraying.

5. Spraying equipment according to claim 1, wherein the handle is tubular and provides a duct by which the spraying liquid is fed into the atomiser.

6. Spraying equipment according to claim 1, wherein the atomiser employs a rotary gauze drum to the inner surface of which the liquid is supplied and from which the atomised droplets are flung by centrifugal force into the passing air stream.

7. Spraying equipment according to claim 1, wherein the engine and fan unit are mounted on a sub-frame which is supported and secured on vibration-absorbing metal and rubber mountings on the support frame.

8. Spraying equipment according to claim 7, wherein the sub-frame is releasably secured on the mountings for removal of the engine and fan unit complete.

9. Spraying equipment comprising a body harness, a back support frame to which the harness is attached, an engine and fan unit mounted on the support frame, a fuel reservoir and a spraying liquid reservoir respectively provided by two compartments in a single tank, a flexible duct the inlet end of which is connected to the fan outlet and adjacent the outlet end contains an atomiser, a liquid supply pipe connected to the liquid reservoir for feeding the liquid to the atomiser, and a handle attached to the duct by which the latter can be held and the spray issuing therefrom directed forwardly by the operator, the tank being of inverted generally L-shaped form with a horizontal limb which contains the fuel reservoir compartment and a vertical limb which contains the spraying liquid reservoir compartment offset to the left-hand side of the frame and disposed alongside the engine which is offset to the right-hand side and the arrangement being such that in use the duct is disposed at the right side of the operator so that said handle can conveniently be held in his right hand.

References Cited

UNITED STATES PATENTS

| 1,986,407 | 1/1935 | Parker | 239—153 |
| 2,958,155 | 11/1960 | Emmerich | 239—153 |
| 2,979,269 | 4/1961 | Bals | 239—77 |
| 3,063,644 | 11/1962 | Bals | 239—222 |
| 3,138,328 | 6/1964 | Glasby | 239—77 |
| 3,199,785 | 8/1965 | Schmierer | 239—153 |

FOREIGN PATENTS

| 246,479 | 8/1963 | Australia. |
| 1,226,484 | 7/1960 | France. |

EVERETT W. KIRBY, *Primary Examiner.*

U.S. Cl. X.R.

239—77, 224, 222